(12) United States Patent
Itadani et al.

(10) Patent No.: US 10,655,736 B2
(45) Date of Patent: May 19, 2020

(54) SLIDING COMPONENT

(71) Applicant: EAGLE INDUSTRY CO., LTD., Minato-Ku, Tokyo (JP)

(72) Inventors: Masatoshi Itadani, Tokyo (JP); Kazumasa Sunagawa, Tokyo (JP); Yuichiro Tokunaga, Tokyo (JP); Hideyuki Inoue, Tokyo (JP); Takeshi Hosoe, Tokyo (JP); Ryoma Yamakawa, Tokyo (JP); Yuta Negishi, Tokyo (JP); Kenji Kiryu, Tokyo (JP); Keiichi Chiba, Tokyo (JP); Akira Yoshino, Tokyo (JP); Hiroshi Kubota, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 15/739,973

(22) PCT Filed: Jun. 23, 2016

(86) PCT No.: PCT/JP2016/068586
§ 371 (c)(1),
(2) Date: Dec. 26, 2017

(87) PCT Pub. No.: WO2017/002691
PCT Pub. Date: Jan. 5, 2017

(65) Prior Publication Data
US 2018/0187784 A1    Jul. 5, 2018

(30) Foreign Application Priority Data
Jun. 27, 2015  (JP) .................................. 2015-129338

(51) Int. Cl.
*F16J 15/34*    (2006.01)
*F04D 29/12*    (2006.01)
(Continued)

(52) U.S. Cl.
CPC ........ *F16J 15/3416* (2013.01); *F04D 29/122* (2013.01); *F16C 33/743* (2013.01);
(Continued)

(58) Field of Classification Search
CPC ...... F16J 15/34; F16J 15/3404; F16J 15/3408; F16J 15/3412; F16J 15/3416; F16J 15/3424
(Continued)

(56) References Cited

U.S. PATENT DOCUMENTS 2,249,930 A * 7/1941 Bailey .................... F16J 15/363
                                                          277/373
2,823,057 A * 2/1958 Slight ..................... F16J 15/36
                                                          277/371
(Continued)

FOREIGN PATENT DOCUMENTS

JP    H07180772 A    7/1995
JP    H07224948 A    8/1995
(Continued)

OTHER PUBLICATIONS

International Search Report (ISR) dated Aug. 9, 2016, issued for International application No. PCT/JP2016/068586.

*Primary Examiner* — Kristina R Fulton
*Assistant Examiner* — L. Susmitha Koneru
(74) *Attorney, Agent, or Firm* — Law Office of Katsuhiro Arai (57) ABSTRACT

In an embodiment, in a sliding component, a sliding face of a stationary-side seal ring 6 has a fluid circulation groove 10 communicating with a high-pressure fluid side via an entrance portion 10a and an exit portion 10b. A rotating-side seal ring 5 has a larger outer diameter and a smaller inner diameter than the seal ring 6. A groove 15 into which a claw is loosely fitted is provided on an outer periphery of the seal
(Continued)

ring 5. A width of the groove 15 is smaller than a distance between the portion 10a and the 10b in the circumferential direction. WMR/WSR is set within a range of 0.75<WMR/WSR<1.4 (WMR is a face width between an inner diameter of the groove 15 and an inner diameter 6b of the sliding face; WSR is a face width of the sliding face).

2 Claims, 3 Drawing Sheets (51) Int. Cl.
*F16C 33/74* (2006.01)
*F16C 33/78* (2006.01)
*F16J 15/16* (2006.01)

(52) U.S. Cl.
CPC ......... *F16C 33/7843* (2013.01); *F16J 15/162* (2013.01); *F16J 15/3412* (2013.01); *F16J 15/3464* (2013.01); *F05D 2240/55* (2013.01)

(58) Field of Classification Search
USPC ........ 277/358, 370–373, 390–394, 396, 397, 277/399, 400
See application file for complete search history.

(56) References Cited

U.S. PATENT DOCUMENTS

| | | | | |
|---|---|---|---|---|
| 3,355,178 A | * | 11/1967 | Hornaday | F16J 15/36 277/372 |
| 3,672,689 A | * | 6/1972 | Hadley | F16J 15/38 277/373 |
| 3,746,350 A | * | 7/1973 | Mayer | F16J 15/3404 277/366 |
| 4,416,458 A | * | 11/1983 | Takenaka | F16J 15/3412 277/399 |
| 4,688,807 A | * | 8/1987 | Warner | F16J 15/348 277/397 |
| 4,997,191 A | * | 3/1991 | Warner | F16J 15/3464 277/377 |
| 5,388,843 A | * | 2/1995 | Sedy | F16J 15/3412 277/397 |
| 5,498,007 A | * | 3/1996 | Kulkarni | F16J 15/3412 277/366 |
| 5,501,470 A | * | 3/1996 | Fuse | F16J 15/3424 277/400 |
| 7,870,654 B2 | * | 1/2011 | Kametaka | F16J 15/3476 277/370 |
| 2005/0077685 A1 | * | 4/2005 | Roddis | F16J 15/3464 277/390 |
| 2014/0314362 A1 | * | 10/2014 | Bussit | F16C 35/073 384/515 |
| 2015/0377360 A1 | | 12/2015 | Itadani et al. | |
| 2016/0033045 A1 | | 2/2016 | Itadani et al. | |
| 2016/0195138 A1 | | 7/2016 | Itadani et al. | |
| 2016/0252182 A1 | | 9/2016 | Itadani et al. | |
| 2017/0002929 A1 | | 1/2017 | Itadani | |

FOREIGN PATENT DOCUMENTS

| | | |
|---|---|---|
| WO | 2014148317 A1 | 9/2014 |
| WO | 2014174725 A1 | 10/2014 |
| WO | 2015046343 A1 | 4/2015 |
| WO | 2015076319 A1 | 5/2015 |
| WO | 2015087799 A1 | 6/2015 |

* cited by examiner

SLIDING COMPONENT

This application is the U.S. National Phase under 35 U.S.C. § 371 of International Application PCT/JP2016/068586, filed Jun. 23, 2016, which claims priority to Japanese Patent Application No. 2015-129338, filed Jun. 27, 2015. The International Application was published under PCT Article 21(2) in a language other than English.

TECHNICAL FIELD

The present invention relates to sliding components suitable for, for example, mechanical seals, bearings, and other sliding units. In particular, the present invention relates to sliding components such as seal rings or bearings which reduce friction by interposing fluid between sliding faces and need to prevent leakage of fluid from the sliding faces.

BACKGROUND ART

In a mechanical seal which is an example of a sliding component, the performance of the mechanical seal is evaluated according to a leakage rate, a wear rate, and torque. In the related art, the sliding material properties and the sliding face roughness of the mechanical seal are optimized to improve the performance, realizing low leakage, long life, and low torque. However, due to the growing awareness of environmental problems in recent years, there is a demand for further improvement in the performance of the mechanical seal and technical development beyond the framework of the related art has been required.

Under such circumstances, the inventor of the present invention has confirmed that, for example, in a mechanical seal of a water pump which is used in the cooling of a water-cooled engine, as time passes, an additive of LLC, which is one kind of antifreeze, for example, silicate, phosphate, or the like (hereinafter referred to as "deposit generation causing substance") is concentrated on the sliding face to generate a deposit, whereby the function of the mechanical seal may deteriorate. The generation of the deposit is considered to occur in a similar manner in a mechanical seal of equipment which handles a chemical or an oil.

In the conventionally known mechanical seals, in order to prevent the occurrence of wear and burning due to frictional heat generation on the sliding face, a groove is formed on the sliding face such that a fluid layer is formed between the sliding faces (for example, refer to Patent Documents 1, 2, and 3); however, these inventions relate to introducing a fluid to the sliding face, and in these inventions, measures have not been taken to prevent the generation of a deposit on the sliding face.

CITATION LIST

Patent Documents

[Patent Document 1] JP7-180772 A
[Patent Document 2] JP7-224948 A
[Patent Document 3] U.S. Pat. No. 5,498,007

SUMMARY OF THE INVENTION

Problem to be Solved by the Invention

An object of the present invention is to provide a sliding component which is capable of promoting circulation of a fluid in a sliding face while realizing both sealing and lubrication which are opposing conditions, and is capable of preventing the generation of a deposit on the sliding face, thereby maintaining a function of sealing the sliding face over a long period.

Means for Solving Problem

In order to achieve the above-described object, a sliding component according to a first aspect of the present invention is characterized by comprising a pair of slide parts which slide relative to each other. One of the sliding parts is a stationary-side seal ring and the other of the sliding parts is a rotating-side seal ring. A sliding face of the stationary-side seal ring is provided with a fluid circulation groove which communicates with a high-pressure fluid side via an entrance portion and an exit portion and is separated from a low-pressure fluid side by a land portion. The rotating-side seal ring is formed to have a larger outer diameter and a smaller inner diameter than the stationary-side seal ring. At least one groove into which a claw of a rotational force transmission member for transmitting a rotational force of a rotating shaft is loosely fitted is provided on an outer periphery of the rotating-side seal ring. A width of the at least one groove in a circumferential direction is smaller than a length in the circumferential direction between the entrance portion and the exit portion of the fluid circulation groove. WMR/WSR is set within a range of 0.75<WMR/WSR<1.4, where WMR is a face width defined between an inner diameter of the at least one groove of the rotating-side seal ring and an inner diameter of the sliding face of the stationary-side seal ring and WSR is a face width of a sliding face of the stationary-side seal ring.

According to the first aspect, the pressures at the entrance portion and the exit portion of the fluid circulation groove constantly fluctuate such that one is higher or smaller than the other, and the fluid in the fluid circulation groove repeatedly moves. Therefore, even in a case in which the sealed fluid includes the deposit generation causing substance, it is possible to prevent the generation of a deposit in the fluid circulation groove to maintain the function of sealing the sliding face over a long period.

In the first aspect, the sliding component according to a second aspect of the present invention is characterized in that the at least one groove includes a plurality of grooves provided in the circumferential direction, and the plurality of grooves are provided such that, when one of the grooves is positioned opposite the entrance portion of the fluid circulation groove, the other grooves are not positioned opposite the exit portion of the fluid circulation groove.

According to the second aspect, the pressure difference between the entrance portion and the exit portion of the fluid circulation groove greatly and reliably generate the pressure difference, and therefore, it is possible to further prevent the generation of a deposit in the fluid circulation groove.

Effects of the Invention

The present invention has the following excellent effects.

(1) The sliding face of the stationary-side seal ring is provided with the fluid circulation groove which communicates with the high-pressure fluid side via the entrance portion and the exit portion and is separated from the low-pressure fluid side by the land portion. The rotating-side seal ring is formed to have a larger outer diameter and a smaller diameter than the stationary-side seal ring. The at least one groove into which the claw of the rotational force transmission member for transmitting the rotational force of the rotating shaft loosely fits is provided on the outer periphery of the rotating-side seal ring. The width of the at least one groove in the circumferential direction is smaller than the length in the circumferential direction between the entrance portion and the exit portion of the fluid circulation groove. WMR/WSR is set within a range of 0.75<WMR/WSR<1.4, where WMR is the face width defined between the inner diameter of the at least one groove of the rotating-side seal ring and the inner diameter of the sliding face of the stationary-side seal ring and WSR is the face width of the sliding face of the stationary-side seal ring, Accordingly, the pressures at the entrance portion and the exit portion of the fluid circulation groove constantly fluctuate such that one is higher or smaller than the other, and the fluid in the fluid circulation groove repeatedly moves. Therefore, even in a case in which the sealed fluid includes the deposit generation causing substance, it is possible to prevent the generation of a deposit in the fluid circulation groove, thereby maintaining the sealing function of the sliding face over a long period.

(2) The at least one groove includes a plurality of grooves, and the plurality of grooves are provided such that, when one of the grooves is positioned opposite the entrance portion of the fluid circulation grooves, the other grooves are not positioned opposite the exit portion of the fluid circulation groove. Accordingly, it is possible to greatly and reliably generate the pressure difference between the entrance portion and the exit portion of the fluid circulation groove, and therefore, it is possible to further prevent the generation of a deposit in the fluid circulation groove.

DESCRIPTION OF EMBODIMENTS

Hereinafter, forms for carrying out the invention will be described by example based on the embodiments with reference to the drawings. However, the dimensions, material, shapes, relative arrangements, and the like of the components which are described in the embodiments are not intended to limit the scope of the present invention unless explicitly stated otherwise.

First Embodiment

A description will be given of a sliding component according to a first embodiment of the present invention, with reference to FIGS. 1 and 2.

In this embodiment, the description will be given exemplifying a mechanical seal which is an example of a sliding component. The outer peripheral side of the slide component which configures the mechanical seal will be described as a high-pressure fluid side (a sealed fluid side) and the inner peripheral side thereof as a low-pressure fluid side (a gas side).

Figure 1:
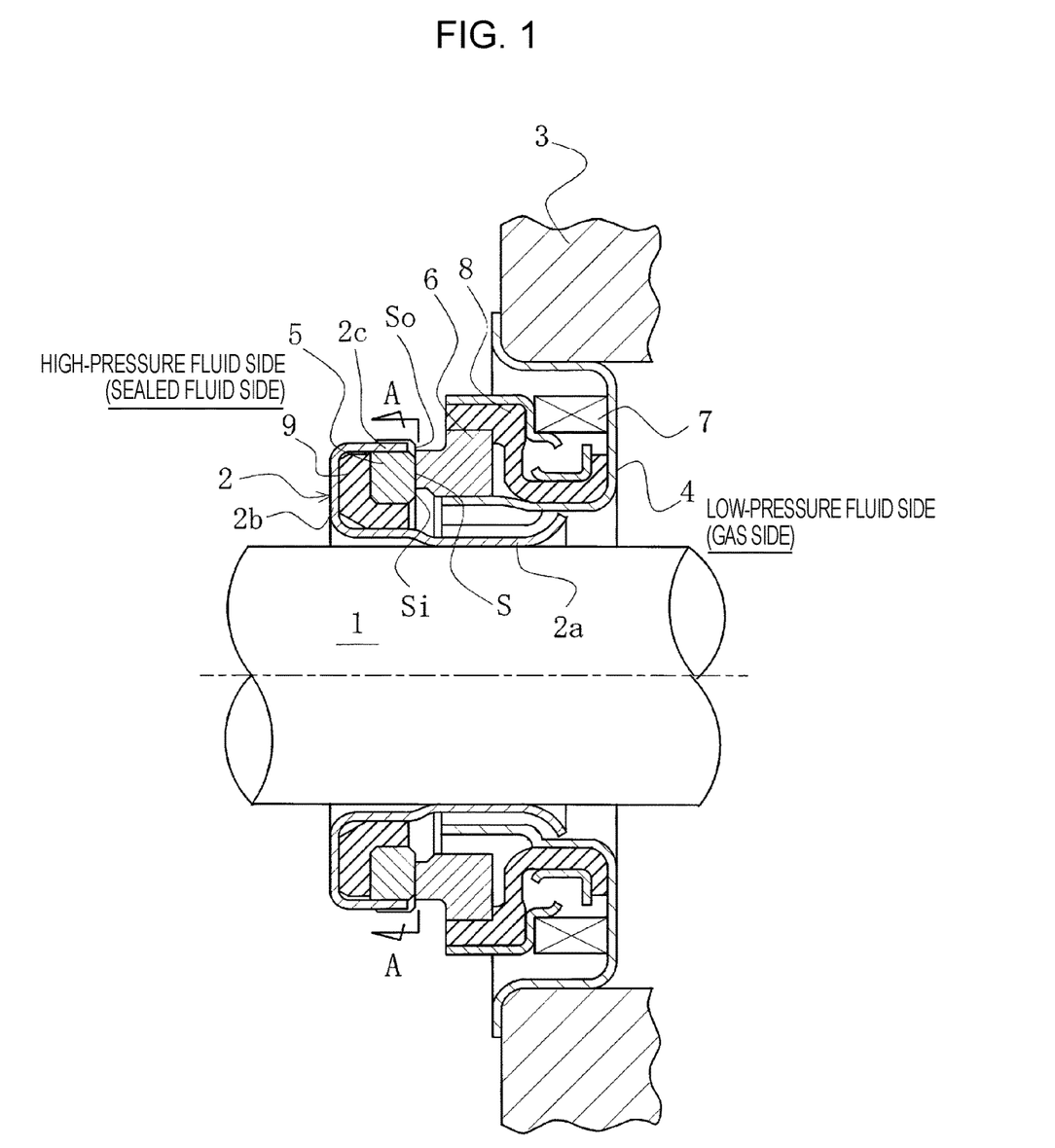
FIG. 1 is a vertical sectional diagram illustrating an example of a mechanical seal according to a first embodiment of the present invention.

FIG. 1 is a vertical sectional diagram illustrating an example of the mechanical seal, which is an inside mechanical seal in a form in which a sealed fluid on the high-pressure fluid side which is apt to leak from the outer periphery on the sliding faces toward the inner periphery is sealed. The mechanical seal is provided with a sleeve 2 which is fixed to a rotating shaft 1 for driving a pump impeller (not illustrated) on the high-pressure fluid side and a cartridge 4 which is fixed to a housing 3. A rotating-side seal ring 5 which has an annular shape and is one of the sliding parts is provided on the sleeve 2. A stationary-side seal ring 6 which slides facing the rotating-side seal ring 5, has an annular shape, and is the other sliding part capable of moving in the axial direction is provided in the cartridge 4. Sliding faces S which are mirror finished by lapping or the like are configured to slide in close contact with each other due to a coiled wave spring 7 and bellows 8 which axially urge the stationary-side seal ring 6. A cup gasket 9 is provided between the sleeve 2 and the rotating-side seal ring 5.

In other words, the mechanical seal prevents the sealed fluid from flowing out from the outer periphery of the rotating shaft 1 to the gas side between the respective sliding faces S of the rotating-side seal ring 5 and the stationary-side seal ring 6.

The sleeve 2 functions as a rotational force transmission member for transmitting a rotational force of the rotating shaft 1 to the rotating-side seal ring 5, and includes an inner cylinder portion 2a which is fitted to the rotating shaft 1, a disk portion 2b which extends radially outward from the high-pressure fluid side of the inner cylinder portion 2a, and an outer cylinder portion 2c which extends from the radially outer side of the disk portion 2b to the low-pressure fluid side, and the sleeve 2 holds the rotating-side sliding ring 5 which has a substantially U-shaped cross section via the cup gasket 9 on the low-pressure fluid side.

The cup gasket 9 is provided across the opposite side of the sliding face of the rotating-side sliding ring 5 and the inner periphery of the rotating-side sliding ring 5.

In the mechanical seal, generally, in order to be capable of supporting a case in which the rotational centers of the rotating-side seal ring 1 and the stationary-side seal ring 5 do not closely match, the width of one of the sliding faces is increased, that is, the outer diameter thereof is increased and the inner diameter thereof is decreased such that a sliding face margin So is formed on the radially outer side thereof and a sliding face margin Si is formed on the radially inner side thereof. In the present invention, a portion at which the rotating-side seal ring 5 and the stationary-side seal ring 6 actually slide against each other is referred to as a sliding portion Ss, and a portion including the sliding portion Ss and the sliding face margins is referred to as a sliding face S.

In FIG. 1, the outer diameter of the rotating-side seal ring 5 is larger than the outer diameter of the stationary-side seal ring 6, the inner diameter of the rotating-side seal ring 5 is smaller than the inner diameter of the stationary-side seal ring 6, and the sliding face margin So on the radially outer side and the sliding face margin Si on the radially inner side are formed on the rotating-side seal ring 5.

In the case of FIG. 1, the outer and inner diameters of the sliding portion Ss of the stationary-side seal ring 6 is the same as those of the sliding face S of the stationary-side seal ring 6.

The materials of the rotating-side seal ring 5 and the stationary-side seal ring 6 are selected from silicon dioxide (SiC) which has excellent wear resistance, carbon which has excellent self lubricity, and the like, and for example, both may be SiC, or a combination of the rotating-side seal ring 5 being Sic and the stationary-side seal ring 6 being carbon is possible.

Figure 2:
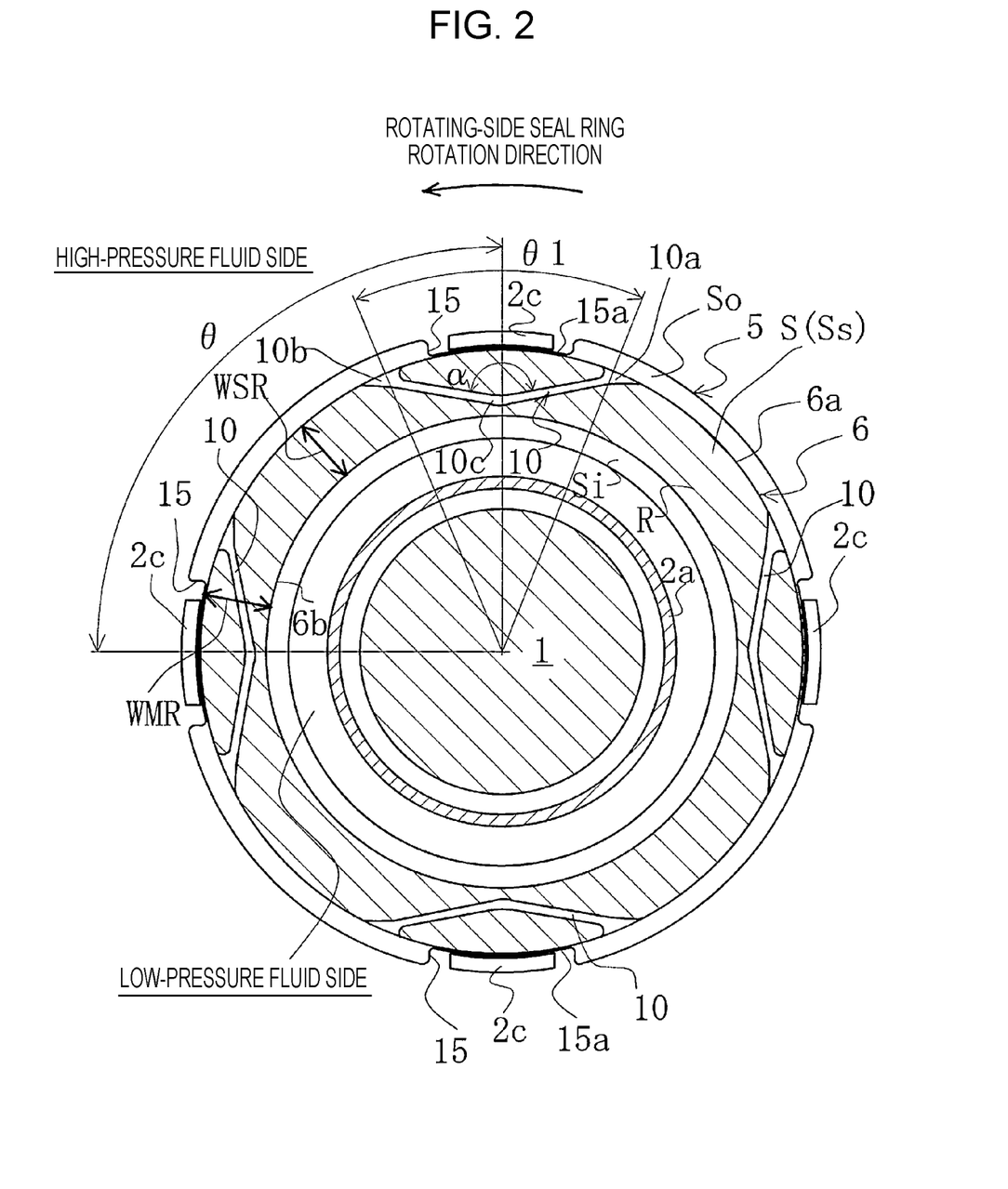
FIG. 2 is a sectional diagram of sliding faces of sliding parts of FIG. 1 taken along A-A, and is a sectional diagram of a portion close to the sliding faces for facilitating the description of the characteristics of the sliding faces.

FIG. 2 is a sectional diagram taken along A-A of FIG. 1. In FIG. 2, the sliding portion Ss of the stationary-side seal ring 6 is depicted with hatching, and a recessed portion (a groove) serving as a surface texture which is formed on the sliding face of the stationary-side seal ring 6 is depicted as solid white. Detailed descriptions will be given of the recessed portion (the groove) which serves as the surface texture.

In FIG. 2, the radially outer side of the sliding face S is the high-pressure fluid side, the radially inner side thereof is the low-pressure fluid side, for example, the gas side, and the rotating-side seal ring 5 rotates in a counterclockwise direction.

As illustrated in FIG. 2, the outer cylinder portions 2c of the sleeve 2 are provided intermittently and partially in the circumferential direction. In the this embodiment, each of the outer cylinder portions 2c forms a claw shape having a fixed width in the circumferential direction, and the four outer cylinder portions 2c are spaced equally in the circumferential direction. The axial tips of the outer cylinder portions 2c extend to the near side of the sliding face S of the rotating-side seal ring 5.

In the present invention, the claw-shaped outer cylinder portions 2c may be referred to as claws.

Meanwhile, four grooves 15 into which the claws 2c are loosely fitted are spaced equally in the circumferential direction on the outer periphery of the rotating-side seal ring 5, and the claws 2c are loosely fitted into the grooves 15.

The four claws 2c are not limited to being equally spaced, and the four grooves 15 are not limited to being equally spaced. The one or more claws 2c and the one or more grooves 15 may be provided. In addition, the one or more claws may 2c are not be limited to be equally spaced, and the one or more grooves 15 are not be limited to be equally spaced.

The rotational force of the rotating shaft 1 is reliably transmitted to the rotating-side seal ring 5 due to the claws 2c being loosely fitted into the grooves 15.

In FIG. 2, the sliding face S of the stationary-side seal ring 6 is a portion depicted with hatching and the width of the sliding face S is WSR. Meanwhile, on the sliding face S of the rotating-side seal ring 5, the sliding face margin So is provided on the radially outer side and the sliding face margin Si is provided on the radially inner side. FIG. 2 shows a case in which a diameter 15a of a bottom portion 15a of the groove 15 of the rotating-side seal ring 5 (in the present invention, this may be referred to as an "inner diameter of a groove") is larger than an outer diameter 6a of the sliding face of the stationary-side seal ring 6.

In a case in which the groove 15 is provided on the outer periphery of the rotating-side seal ring 5 and the inner diameter of the groove 15 is set larger than an outer diameter 6a of the sliding face of the stationary-side seal ring 6, WMR/WSR is set to less than or equal to 1.4, where WMR is the face width defined between the inner diameter 15a of the groove of the rotating-side seal ring 5 and an inner diameter 6b of the sliding face S of the stationary-side seal ring 6. Preferably, WMR/WSR is set to less than or equal to 1.2. More preferably, WMR/WSR is set to less than or equal to 1.1.

The reason therefor will be described later in detail.

In FIG. 2, in the sliding face S of the stationary-side seal ring 6, four fluid circulation grooves 10 which communicate with the high-pressure fluid side and are separated from the low-pressure fluid side by a smooth portion R (in the present invention, this may be referred to as a "land portion") of the sliding face are equally spaced in the circumferential direction. The fluid circulation grooves 10 are recessed portions (grooves) which serve as the surface texture which is described above.

The four fluid circulation grooves 10 are not limited to be provided, and at least one fluid circulation groove may be provided, and it is not necessary for the at least one fluid circulation groove 10 to be equally spaced.

The fluid circulation grooves 10 each includes an entrance portion 10a into which the sealed fluid flows from the high-pressure fluid side, an exit portion 10b out of which the sealed fluid flows to the high-pressure fluid side, and a communication portion 10c which communicates the entrance portion 10a with the exit portion 10b in the circumferential direction. The fluid circulation groove 10 serves the role of actively introducing the sealed fluid from the high-pressure fluid side to the sliding portion and discharging the sealed fluid in order to prevent the fluid including corrosion products and the like from being concentrated at the sliding portion Ss. The entrance portion 10a and the exit portion 10b are formed such that the openings thereof are widen as illustrated. Therefore, the fluid circulation groove 10 easily introduces the sealed fluid into the sliding face according to the rotation of the other sliding face, and discharges the sealed fluid. In addition, the fluid circulation groove 10 is separated from the low-pressure fluid side by the land portion R in order to reduce leakage.

In this embodiment, the entrance portion 10a and the exit portion 10b are each formed into a linear shape to substantially form a V shape; however, the configuration is not particularly limited thereto, and a configuration may be adopted in which an angle α formed by the entrance portion 10a and the exit portion 10b is larger or smaller. The entrance portion 10a and the exit portion 10b are formed into not a linear shape but a curved shape (an arc shape or the like). The width and the depth of the fluid circulation groove 10 are suitably set according to the pressure, the type (the viscosity), and the like of the sealed fluid. The depth thereof, for example, is approximately 100 μm to 300 μm.

The fluid circulation groove 10 is not limited to being substantially V-shaped but may be U-shaped, for example. In other words, the fluid circulation groove 10 may be formed into any desired shape as long as the entrance portion and the exit portion are in communication with the high-pressure fluid side.

As described above, in a case in which the groove 15 is provided on the outer periphery of the rotating-side seal ring 5 and the inner diameter of the groove 15 is set larger than the outer diameter 6a of the sliding face of the stationary-side seal ring 6, WMR/WSR is set to less than or equal to 1.4, where WMR is the face width defined between the inner diameter 15a of the groove of the rotating-side seal ring 5 and the inner diameter 6b of the sliding face S of the stationary-side seal ring 6 and WSR is the face width of the sliding face S of the stationary-side seal ring 6. Accordingly, the groove 15 functions as an interference groove which generates pressure fluctuation in the fluid in the fluid circulation groove 10. In other words, the groove 15 communicates with the high-pressure fluid side and is provided radially close to the entrance portion 10a and the exit portion 10b of the fluid circulation groove 10 from the sliding face margin So. Therefore, the groove 15 generates the pressure fluctuation in the fluid in the entrance portion 10a and the exit portion 10b of the fluid circulation groove 10.

In this manner, the groove 15 serves the role of reliably transmitting the rotational force of the rotating shaft 1 to the rotating-side seal ring 5 and also has the effect of generating the pressure fluctuation in the fluid in the fluid circulation groove 10 which prevents the fluid including corrosion products and the like from being concentrated at the sliding portion Ss and preventing the generation of the deposit inside the fluid circulation groove 10.

Although the cross-sectional shape of the groove 15 is depicted as a substantially rectangular shape in FIG. 2, the shape is not limited thereto, and the shape may be circular, elliptical, rhomboid, or the like. In other words, as long as the groove 15 communicates with the high-pressure fluid side and the bottom portion 15a on the radially inner side is positioned radially close to the entrance portion 10a and the exit portion 10b of the fluid circulation groove 10, any desired shape may be possible.

In FIG. 2, the four grooves 15 are spaced equally in the circumferential direction; however, the width of each of the grooves 15 in the circumferential direction is set to be smaller than the length in the circumferential direction between the entrance portion 10a and the exit portion 10b of the fluid circulation groove 10, and therefore, one groove 15 is not positioned opposite both the entrance portion 10a and the exit portion 10b of the fluid circulation groove 10.

In the case of FIG. 2, the four fluid circulation grooves 10 are spaced equally, a central angle θ1 formed by the entrance portion 10a and the exit portion 10b of the fluid circulation groove 10 is approximately 45°, and a central angle θ formed by the adjacent grooves 15 is 90°. Therefore, when the rotating-side seal ring 5 rotates and one of the grooves 15 is positioned opposite the entrance portion 10a of one of the fluid circulation grooves 10, the other grooves 10 are not positioned opposite the exit portion 10b of the one of the fluid circulation grooves 10.

When the rotating-side seal ring 5 is rotated, a vortex is generated in the vicinity of the groove 15, and the groove 15 which accompanies the vortex moves in the circumferential direction.

At this time, when one of the grooves 15 reaches a position opposite the entrance portion 10a of one of the fluid circulation grooves 10, the pressure of the fluid in the entrance portion 10a rises. In this case, the other interference grooves 15 are not positioned opposite the exit portion 10b of the one of the fluid circulation grooves 10. Therefore, there is no pressure rise in the fluid in the exit portion 10b, and the pressure of the entrance portion 10a > the pressure of the exit portion 10b is satisfied.

Next, when the one of the grooves 15 reaches a position opposite the exit portion 10b of the one fluid circulation groove 10, the pressure of the fluid in the exit portion 10b rises. In this case, the other grooves 15 are not positioned opposite the entrance portion 10a. Therefore, there is no pressure rise in the fluid in the entrance portion 10b, and the pressure of the entrance portion 10a < the pressure of the exit portion 10b is satisfied.

In other words, taking into consideration one of the fluid circulation groove 10, due to the action of the groove 15, the pressures at the entrance portion 10a and the exit portion 10b constantly fluctuate such that one is higher or smaller than the other.

When the pressures at the entrance portion 10a and the exit portion 10b constantly fluctuate such that one is higher or smaller than the other, the fluid in the fluid circulation groove 10 repeatedly moves. Therefore, even in a case in which, for example, the sealed fluid includes the deposit generation causing substance, generation of a deposit in the fluid circulation groove 10 is prevented.

In first embodiment, the following remarkable effects are achieved.

(1) The fluid circulation groove 10 which communicates with the high-pressure fluid side via the entrance portion 10a and the exit portion 10b and is separated from the low-pressure fluid side by the land portion R is provided in the sliding face of the stationary-side seal ring 6. The rotating-side seal ring 5 is formed to have a larger outer diameter and a smaller inner diameter than the stationary-side seal ring 6. The groove 15 into which the claw 2c of the rotational force transmission member for transmitting the rotational force of the rotating shaft loosely fits is provided on the outer periphery of the rotating-side seal ring 5. The width of the groove 15 in the circumferential direction is small in comparison with the length in the circumferential direction between the entrance portion a and the exit portion of the fluid circulation groove, and WMR/WSR is set to less than or equal to 1.4, where WMR is the face width defined between the inner diameter 15a of the groove of the rotating-side seal ring 5 and the inner diameter 6b of the sliding face S of the stationary-side seal ring 6 and WSR is the face width of the sliding face S of the stationary-side seal ring 6. Accordingly, the pressures at the entrance portion 10a and the exit portion 10b constantly fluctuate such that one is higher or smaller than the other, and the fluid in the fluid circulation groove 10 repeatedly moves. Therefore, even in a case in which the sealed fluid includes the deposit generation causing substance, it is possible to prevent the generation of a deposit in the fluid circulation groove 10, thereby maintaining the sealing function of the sliding face over a long period.

(2) The at least one groove includes a plurality of the grooves 15 provided in the circumferential direction, and the plurality of grooves 15 are provided such that, when one of the grooves 15 is positioned opposite the entrance portion 10a of one of the fluid circulation grooves 10, the other grooves 15 are not positioned opposite the exit portion 10b of the one of the fluid circulation grooves 10. Accordingly, it is possible to greatly and reliably generate the pressure difference between the entrance portion 10a and the exit portion 10b of the fluid circulation groove 10. Therefore, it is possible to further prevent the generation of a deposit in the fluid circulation groove 10.

Second Embodiment

A description will be given of a sliding component according to a second embodiment of the present invention, with reference to FIG. 3.

Although the second embodiment differs from the first embodiment in that the inner diameter of the groove 15 is set to be smaller than the outer diameter 6a of the sliding face of the stationary-side seal ring 6, the other basic configurations of the second embodiment are the same as those of the first embodiment.

Figure 3:
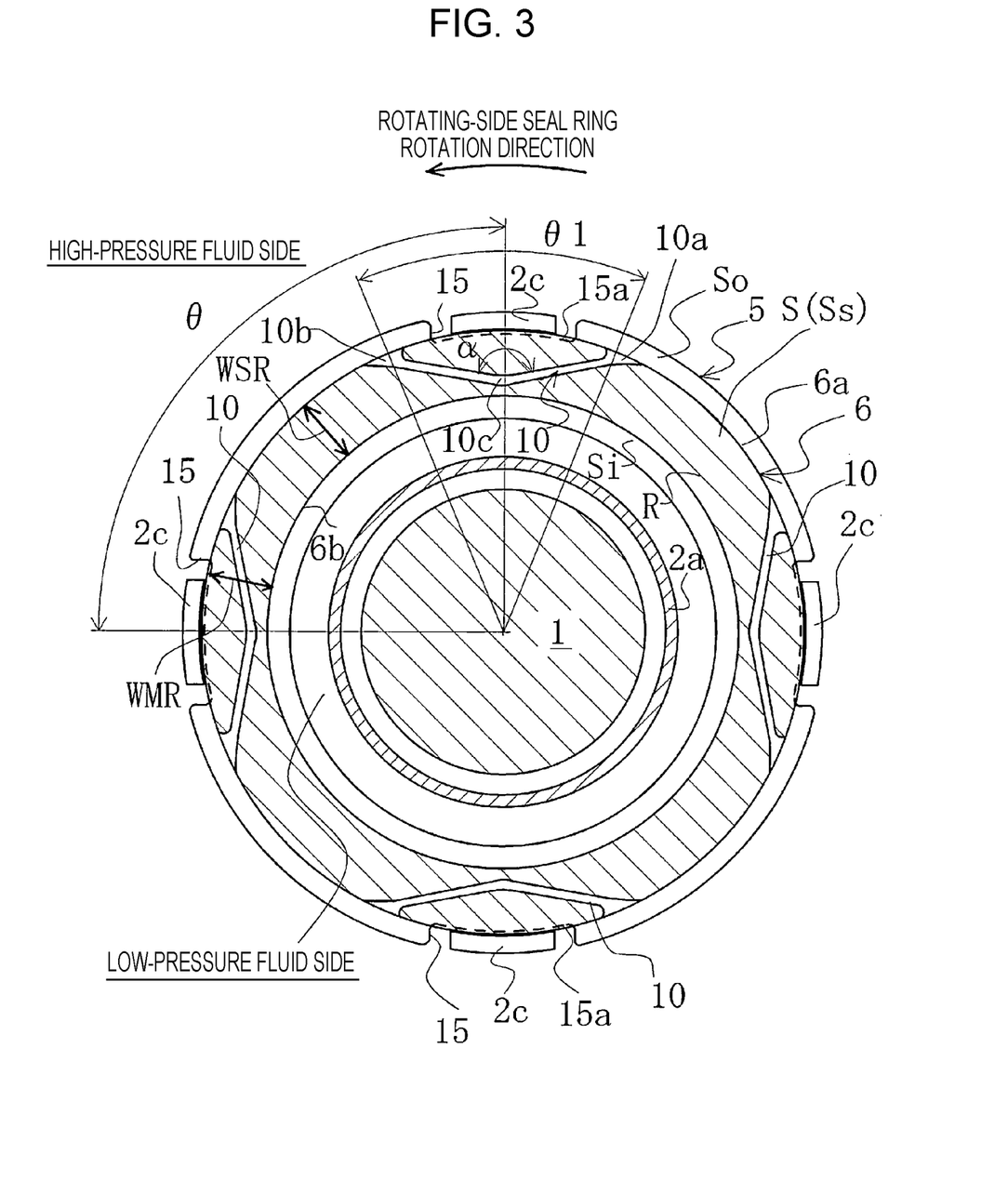
FIG. 3 is a diagram similar to FIG. 2 and illustrates a second embodiment.

In FIG. 3, the same reference numerals as those in FIG. 2 indicate the same members as those in FIG. 2 and redundant descriptions thereof will be omitted.

In FIG. 3, the inner diameter of the bottom portion 15a of the groove 15 provided on the outer periphery of the rotating-side seal ring 5, that is, the inner diameter of the groove 15 is set to be smaller than the outer diameter 6a of the sliding face of the stationary-side seal ring 6. WMR/MSR is set to greater than or equal to 0.75, where WMR is the face width defined between the inner diameter 15a of the groove of the rotating-side seal ring 5 and the inner diameter 6b of the sliding face S of the stationary-side seal ring 6 and WSR is the face width of the sliding face S of the stationary-side seal ring 6. Preferably, WMR/WSR is set to greater than or equal to 0.85. More preferably, WMR/WSR is set to greater than or equal to 0.95.

In this manner, in a case in which the groove 15 is provided on the outer periphery of the rotating-side seal ring 5 and the inner diameter of the groove 15 is set smaller than the outer diameter 6a of the sliding face of the stationary-side seal ring 6, WMR/WSR is set to larger than or equal to 0.75, where WMR is the face width defined between the inner diameter 15a of the groove of the rotating-side seal ring 5 and the inner diameter 6b of the sliding face S of the stationary-side seal ring 6 and WSR is the face width of the sliding face S of the stationary-side seal ring 6. Therefore, the groove 15 functions as an interference groove which generates more pressure fluctuation in the fluid in the fluid circulation groove 10. In other words, the groove 15 communicates with the high-pressure fluid side, radially extends from the sliding face margin So to the sliding portion Ss, and is provided to radially overlap the entrance portion 10a and the exit portion 10b of the fluid circulation groove 10. Therefore, the groove 15 generates more pressure fluctuation in the fluid in the entrance portion 10a and the exit portion 10b of the fluid circulation groove 10.

In this manner, the groove 15 serves the role of reliably transmitting the rotational force of the rotating shaft 1 to the rotating-side seal ring 5 and also has the effect of generating more pressure fluctuation in the fluid in the fluid circulation groove 10 which prevents the fluid including corrosion products and the like from being concentrated at the sliding portion Ss to prevent the generation of the deposit inside the fluid circulation groove 10.

Hereinabove, although the embodiments of the present invention are described with reference to the drawings, specific configurations are not limited to the embodiments, and even if there are changes or additions within a scope not deviating from the gist of the present invention, such changes or additions are included in the present invention.

For example, in the embodiments, an example in which the sliding part is used for one of the pair of rotating seal ring and the stationary seal ring in a mechanical sealing device is described; however, it is also possible to use the sliding part as a bearing sliding part which slides with a rotating shaft while sealing a lubricant on one side in the axial direction of a cylindrical sliding face.

For example, in the embodiments, a description is given of a case in which the fluid circulation groove is provided in the stationary-side seal ring of the mechanical seal ring which configures the sliding part and at least one groove is provided on the outer periphery of the rotating-side seal ring; however, conversely, the fluid circulation groove may be provided in the rotating-side seal ring, and the at least one groove may be provided in the stationary-side seal ring. In this case, the sliding face margin is provided in the stationary-side seal ring.

For example, in the first embodiment, a description is given of a case in which the inner diameters of all the grooves are larger than the outer diameter of the sliding face of the stationary-side seal ring, and in the second embodiment, a description is given of a case in which the inner diameters of all the grooves are smaller than the outer diameter of the sliding face of the stationary-side seal ring; however, the present invention is not limited thereto, a plurality of grooves may be provided in the circumferential direction and a combination of these embodiments may be possible.

For example, in the first and second embodiments, a description is given of an inside mechanical seal in which the outer peripheral side of the sliding parts which configures the mechanical seal is described as the high-pressure fluid side (the sealed fluid side) and the inner peripheral side thereof is the low-pressure fluid side (the gas side); however, the present invention is not limited thereto and it is possible to apply the present invention to an outside mechanical seal.

For example, in FIGS. 2 and 3, cases in which the claw 2c is positioned in the center of the circumferential direction of the groove 15; however, the present invention is not limited thereto, and the claw 2c may be arranged close to one end of the groove 15 in the circumferential direction.

REFERENCE SIGN LIST 1 rotating shaft
2 sleeve
2a inner cylinder portion
2b disk portion
2c outer cylinder portion
3 housing
4 cartridge
5 rotating-side seal ring
6 stationary-side seal ring housing
7 coiled wave spring
8 bellows
9 cup gasket
10 fluid circulation groove
10a entrance portion
10b exit portion
10c communication portion
15 groove
15a bottom portion of groove
R land portion
S sliding face
Ss sliding portion
So sliding face margin on radially outer side
Si sliding face margin on radially inner side

The invention claimed is:

1. A sliding component capable of suppressing leakage of a fluid containing a deposit-generation-causing substance from sliding faces, comprising:
    a pair of sliding parts which slide relative to each other,
    wherein one of the sliding parts is a stationary-side seal ring having one of the sliding faces and the other of the sliding parts is a rotating-side seal ring having another of the sliding faces,
    wherein the sliding face of the stationary-side seal ring is provided with at least one fluid circulation groove, all of which fluid circulation groove(s) each is/are provided only on a high-pressure fluid side and constituted by an entrance portion and an exit portion apart from each other by a land portion of the sliding face of the stationary-side seal ring, and a communication portion connecting the entrance portion and the exit portion,
    wherein each fluid circulation groove communicates with the high-pressure fluid side via the entrance portion and the exit portion and is separated from a low-pressure fluid side by the land portion of the sliding face of the stationary-side seal ring,
    wherein the rotating-side seal ring is formed to have a larger outer diameter and a smaller inner diameter than an outer diameter and an inner diameter of the stationary-side seal ring, respectively, in a manner that an outer sliding face margin (So) and an inner sliding face margin (Si) are formed circumferentially on a radially outer side and a radially inner side of a sliding portion (Ss) of the sliding face of the rotating-side seal ring, respectively, wherein So, Ss, and Si are formed on a same plane orthogonal to an axial direction of the rotating-side seal ring, wherein at least one groove into which a claw of a rotational force transmission member for transmitting a rotational force of a rotating shaft is loosely fitted at a bottom of the at least one groove is provided in the outer sliding face margin (So) on an outer periphery of the rotating-side seal ring, wherein the bottom of the at least one groove is a deepest part of the at least one groove in a radial direction, wherein a width of the bottom of the at least one groove in a circumferential direction is greater than a width of the claw in the circumferential direction, and gaps having a depth of the bottom of the at least one groove are formed next to the claw in the at least one groove in the circumferential direction, wherein a width of the at least one groove in the circumferential direction is smaller than a length in the circumferential direction between the entrance portion and the exit portion of the fluid circulation groove, wherein WMR/WSR is set within a range of 0.75<WMR/WSR<1.4, where WMR is a difference between an inner diameter defined by the bottom of the at least one groove of the rotating-side seal ring and an inner diameter of the sliding face of the stationary-side seal ring, and WSR is a face width of the sliding face of the stationary-side seal ring, and wherein the at least one groove includes a plurality of grooves arranged in the circumferential direction in a manner that when one of the grooves is positioned facing the entrance portion of the at least one fluid circulation groove, all other grooves are not positioned facing the exit portion of the at least one fluid circulation groove such that pressure fluctuates at the entrance portion and at the exit portion, alternately, to suppress a deposit of the substance contained in the fluid, while the at least one fluid circulation groove on the stationary-side seal ring and the plurality of grooves on the rotating-side seal ring move relative to each other.

2. The sliding component according to claim 1, wherein the deposit-generation-causing substance contained in the fluid is at least one of antifreeze or oil.

* * * * *